July 24, 1962     E. J. ARMATA     3,046,531
SATURABLE REACTOR SHIFT REGISTER
Filed June 28, 1957
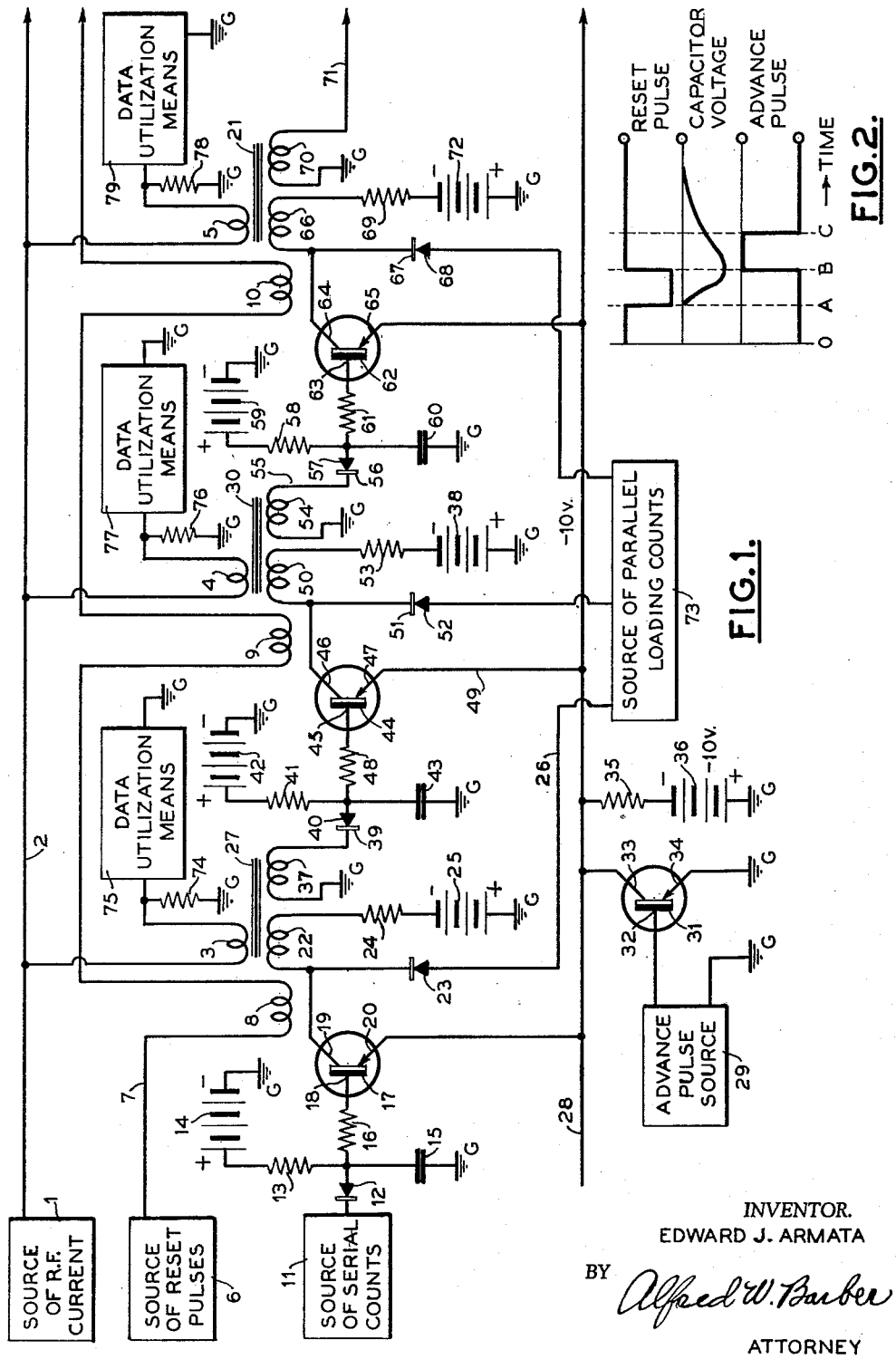
INVENTOR.
EDWARD J. ARMATA
BY Alfred W. Barber
ATTORNEY 3,046,531
SATURABLE REACTOR SHIFT REGISTER
Edward J. Armata, Glen Cove, N.Y., assignor to Potter Instrument Company, Inc., Plainview, N.Y., a corporation of New York
Filed June 28, 1957, Ser. No. 668,779
2 Claims. (Cl. 340—174)

The present invention concerns electronic shift registers and ring counters or the like.

Counting or the storage of information by electronic means is commonly accomplished by two state devices. One state represents a zero and the other state represents a one. Vacuum tubes have been used in the past but in complex computer equipment the power and heat associated with a large number of tubes creates a very considerable problem. The present invention concerns shift registers and ring counters utilizing a combination of saturable reactors and transistors which are much smaller, more reliable and much less power consuming and heat producing than similar devices utilizing vacuum tubes. The saturable reactors utilized in the present system are of the type disclosed in the patent application of Richard L. Snyder filed on Aug. 24, 1955, and bearing Serial Number 530,253, now U.S. Patent No. 2,886,790 issued May 12, 1959. It has been found that a combination of these saturable reactors with transistors provides a simple and reliable circuit which may be utilized as a shift register or ring counter. The saturable reactor has four windings. Two of these windings may be termed control windings, one is a resetting winding and the fourth is a signal winding. Suitable current amplitudes passed through either one or both of the control windings will "set" the reactor. According to the present invention setting current is passed through one of the control windings by means of a transistor. When the reactor is reset by means of current passed through the resetting winding, a pulse will be generated in the second control winding due to the collapse of the field set in the reactor. This pulse is used to charge a capacitor. The transistor of the following stage is connected to this capacitor which determines whether or not when the transistor is pulsed it will or will not turn on or set its associated saturable reactor. The signal winding may be utilized to interrogate the reactor without modifying its magnetic state.

One object of the present invention is to provide a simple and reliable shift register or ring counter.

Another object is to provide a shift register which requires no stand-by power.

Still another object is to provide a ring counter which requires no stand-by power.

A further object is to provide a shift register employing saturable reactors which may be interrogated without altering the magnetic state of the reactors.

A still further object is to provide a shift register or ring counter which does not require critical voltages or components.

Another object is to provide a shift register or ring counter of extreme reliability and long life.

These and other objects will be apparent from the detailed description of the invention given in connection with the figures of the drawing.

In the drawing:

FIG. 1 shows a circuit diagram partly in block form of a preferred embodiment of the present invention.

FIG. 2 shows pulse-time conditions useful in explaining the invention.

FIG. 1 shows a source of radio frequency current 1 carried by a common lead 2 to signal winding 3, 4 and 5 of three saturable reactors. Each of the three saturable reactors has the property that when saturated, the signal winding coupled to the core sees a low permeability and hence has low impedance allowing radio frequency current to pass freely and, on the other hand, when the reactor is not saturated, the core permeability is high and the signal winding impedance is high blocking the current. The signal on common lead 2 therefore divides between the signal coils and their load resistors. The signal, for example, divides between coil 3 acting as series impedance and a load impedance 74. As indicated above when the core is saturated coil 3 has a relatively low impedance and a maximum signal voltage occurs across impedance 74 which in turn is applied to an indicator lamp or other data utilization means 75. On the other hand, when the core of the reactor is unsaturated, i.e. when the stage is off, the impedance of coil 3 is a maximum and a minimum of signal voltage appears across load 74 and is applied to utilization means 75. Signal coils 4 and 5 with loads 76 and 78 and data utilization means 77 and 79 operate in a similar manner.

Each saturable reactor comprises a magnetizable core with four windings as, for example core 27 with signal winding 3, reset winding 8, control winding 22 and another winding similar to the control winding 37. The reactor is turned to the "on" state or a state of saturation by means of pulses from a source of serial counts 11 passing through rectifier 12 to charge capacitor 15 in a negative direction and thereby placing a negative bias on base 18 of transistor 17 through current limiting resistor 16 and counteracting the positive bias originally supplied from bias source 14 through resistor 13. Transistor 17 is kept in a non-conducting state by bias 36 applied through current limiting resistor 35 to common lead 28 and to emitter 20. Even in the presence of a negative bias on base 18, collector 19 connected to control coil 22, and bias source 25 through limiting resistor 24 cannot supply enough current to control coil 22 to saturate core 27 due to the limiting effect of resistor 35. Alternately bias bus 28 is kept far enough negative by bias source 36 and with respect to base 18 so that negative pulses across capacitor 15 and on base 18 are insufficient to render transistor 17 conducting. However, transistor 31 will supply a low impedance path from collector 33 to emitter 34 permitting saturating current to flow through coil 22, collector 19 and emitter 20 when base 32 is pulsed negatively by pulses from advance pulse source 29. Thus, when a pulse from 11 coincides with a pulse from 29 saturating current flows in coil 22 saturating core 27 and turning the reactor stage "on." This is also evidenced by an increase in signal voltage across load impedance 74. Signal coils 3, 4 and 5 act as series impedances which are high impedances when cores 27, 30 and 21 are unsaturated or "off" and low impedances when saturated or "on." Since these impedances are in series with the R.F. source 1, they control the signal voltages across load impedances 74, 76 and 78 respectively. Windings 3, 4 and 5 are balanced with respect to the other windings and changing magnetic states of the core induces only a relatively small voltage in these windings, i.e. small compared with the useful signals. The R.F. current may be on continuously or may be switched on for interrogation. This stage may also be turned on by pulses from source of parallel loading counts 73 supplied to control coil 22 over lead 26 and through rectifier 23.

In order to turn the first stage "off" and transfer the count if any to the second stage, reset pulses from source of reset pulses 6 are applied over lead 7 to the reset coils 8, 9 and 10 connected in series. These reset coils are wound on their respective cores in such a way that when pulsed the core is demagnetized as set forth in the application referenced above. When a reset pulse is applied to coil 8, the core 27 is demagnetized and in the process the flux collapses generating a current in coil 37. This current is passed through a diode consisting of cathode 39 and anode 40 so that a negative voltage is established across capacitor 43 offsetting the positive bias from source 42, through resistor 41 and placing a negative bias through current limiting resistor 48 on base 45 of transistor 44. Here the presence of the negative bias on base 45 allows saturating current to flow from source 38 through resistor 53, collector 46, emitter 47 over lead 49 and through collector 33 to emitter 34 in the presence of an advance pulse on base 32. Thus the "on" condition of core 27 is transferred to core 30. If core 27 were not saturated, i.e. is in the "off" condition no current pulse will be generated in coil 37 and no saturating current will flow in coil 50. Thus the "on" or "off" condition of core 27 is transferred to core 30.

In a similar manner information is stepped from core 30 to core 21. Core 30 has coil 54 connected by lead 55 to diode 56—57 across capacitor 60 normally receiving a bias from source 59 through resistor 58 which provides bias to base 63 of transistor 62 through resistor 61. Control coil 66 is connected through collector 64 and base 65 to advance pulse lead 28. Control coil 50 is connected to parallel loading source 73 through diode 51—52. Coil 66 is connected to source 72 through resistor 69 and to parallel loading source 73 through diode 67—68. Coil 70 is connected to any additional stages over lead 71. Signal coil 4 feeds load 76 and utilization means 77 while signal coil 5 feeds load 78 and utilization means 79.

If lead 71 is returned to input diode 12 a "ring" is completed having 3 stages. A more conventional "ring" of ten stages and counting to ten is constructed by using ten of the described stages. A "count" of one will circulate in the "ring" in response to input counts and each time the count passes a predetermined point, an output pulse will be available indicating a count of ten.

FIG. 2 shows the reset pulse which starts at time A and is of sufficient duration to insure that all cores in the system are demagnetized. The curve of capacitor voltage shows how the capacitor voltage builds up to a maximum negative value during the period of reset and then decays. The advance pulse starts at or soon after the end of the reset pulse but while the capacitor voltage is still sufficiently negative and lasts for a time sufficient to insure that the cores have had time to reach full magnetization.

While only a single embodiment of the present invention has been shown and described, many modifications will be apparent to those skilled in the art and within the spirit and scope of the invention as set forth in particular in the appended claims.

What is claimed is:

1. In a shift register, the combination of a plurality of saturable reactors each including a signal winding for series connection between a source of radio frequency current and utilization means to develop a high impedance when the reactor is unsaturated and to develop a low impedance when the reactor is saturated; means to saturate the reactor including means to connect a source of serial count pulses to the reactor through a switching transistor; means to connect a source of bias potential to the switching transistor so that serial count pulses normally are blocked; means to remove the bias potential from the switching transistor responsive to a source of count advance pulses; reset winding means to reset the reactor to an unsaturated state responsive to a source of reset pulses; and another winding to develop an electrical potential responsive to the resetting of the reactor to develop a saturating current in the control winding of a succeeding stage upon removal of the bias potential from the switching transistor associated with the succeeding stage.

2. In a shift register as set forth in claim 1 wherein a source of parallel loading count pulses is connected to permit overriding the bias potential.

References Cited in the file of this patent
UNITED STATES PATENTS

| | | |
|---|---|---|
| 2,747,110 | Jones | May 22, 1956 |
| 2,802,953 | Arsenault et al. | Aug. 13, 1957 |
| 2,832,945 | Christensen | Apr. 29, 1958 |
| 2,845,611 | Williams | July 29, 1958 |
| 2,863,138 | Hemphill | Dec. 2, 1958 |
| 2,866,178 | Lo et al. | Dec. 23, 1958 |
| 2,876,438 | Jones | Mar. 3, 1959 |
| 2,902,609 | Ostroff et al. | Sept. 1, 1959 |
| 2,911,626 | Jones et al. | Nov. 3, 1959 |
| 2,921,136 | Cooke | Jan. 12, 1960 |
| 2,934,270 | Logue et al. | Apr. 26, 1960 |
| 2,959,770 | Eckert | Nov. 8, 1960 |

OTHER REFERENCES

"A Radio-Frequency Nondestructive Readout for Magnetic Core Memories," by B. Widrow, published December 1954, "I.R.E. Transactions-Electronic Computers," vol. EC-3, issue—4, pages 12–15.